United States Patent [19]

Jilani

[11] 4,098,349
[45] Jul. 4, 1978

[54] HIGH-SPEED AGRICULTURAL DISC

[75] Inventor: Atiq A. Jilani, Oak Lawn, Ill.

[73] Assignee: Borg-Warner Corporation, Chicago, Ill.

[21] Appl. No.: 810,124

[22] Filed: Jun. 27, 1977

[51] Int. Cl.² ............................................. A01B 15/16
[52] U.S. Cl. ..................................... 172/555; 172/604
[58] Field of Search ............. 172/604, 567, 603, 166, 172/556, 540, 548, 555, 177; 301/64 SD, 64 R, 63 R

[56] References Cited

U.S. PATENT DOCUMENTS

| D. 138,712 | 9/1944 | Karl | D15/29 |
|---|---|---|---|
| 466,772 | 1/1892 | Clark | 172/604 |
| 1,060,280 | 4/1913 | Olson | 172/604 |
| 1,113,241 | 10/1914 | Niesz | 172/604 X |
| 2,705,448 | 4/1955 | Ingersoll | 172/555 |
| 3,097,704 | 7/1963 | Gillespie | 172/540 |
| 3,181,616 | 5/1965 | Oppel | 172/58 |
| 3,213,514 | 10/1965 | Evans | 172/555 X |

Primary Examiner—Richard J. Johnson
Attorney, Agent, or Firm—James E. Tracy

[57] ABSTRACT

By providing a circular, dished agricultural disc with peripheral W-shaped notches, a small tooth being formed at the center of each notch, the disc may be operated at relatively high speeds while still achieving vigorous cutting, stirring and mixing of the soil. At the same time, excessive throwing of soil is avoided, thereby preventing soil accumulation into high ridges with wide intervening furrows.

7 Claims, 2 Drawing Figures

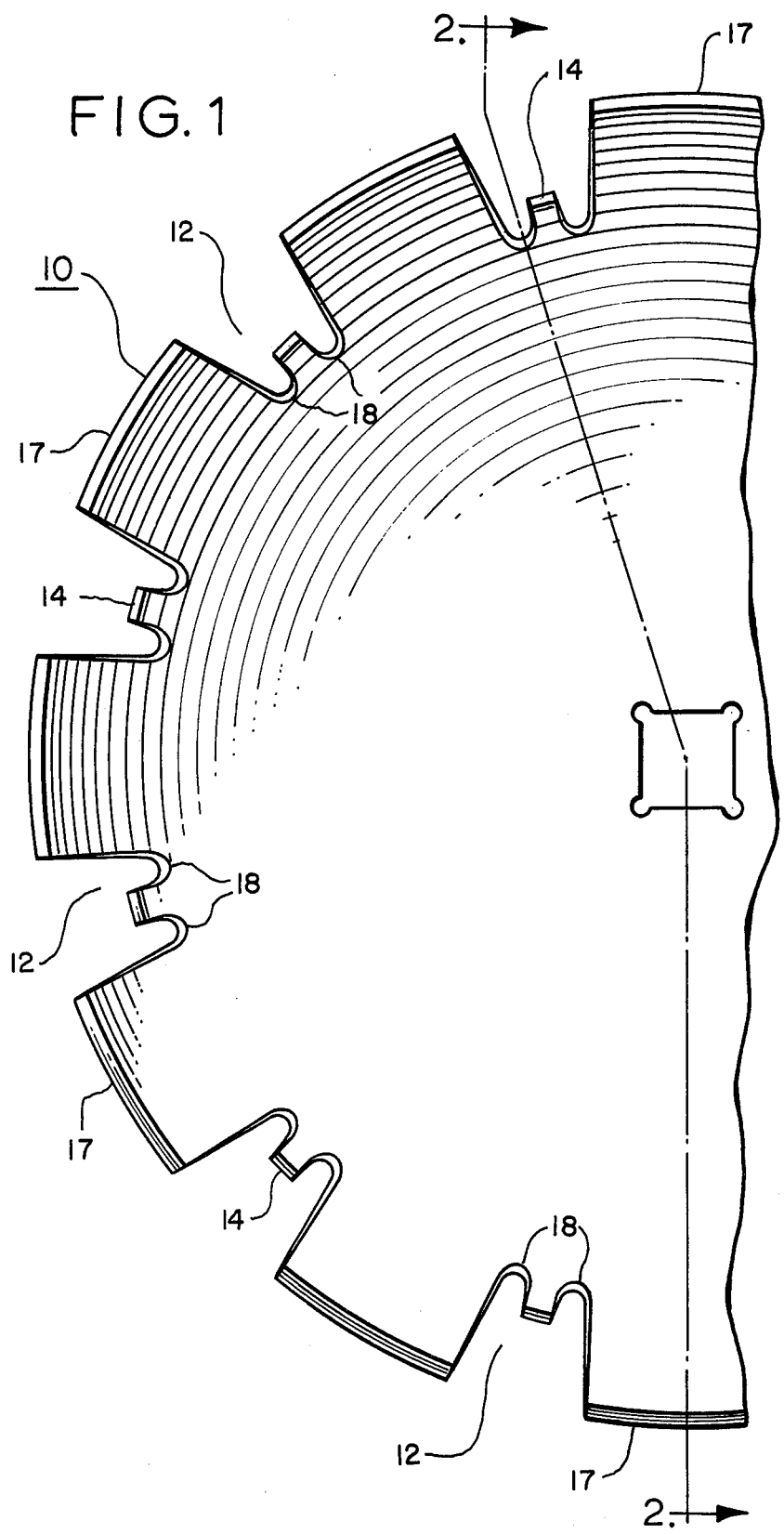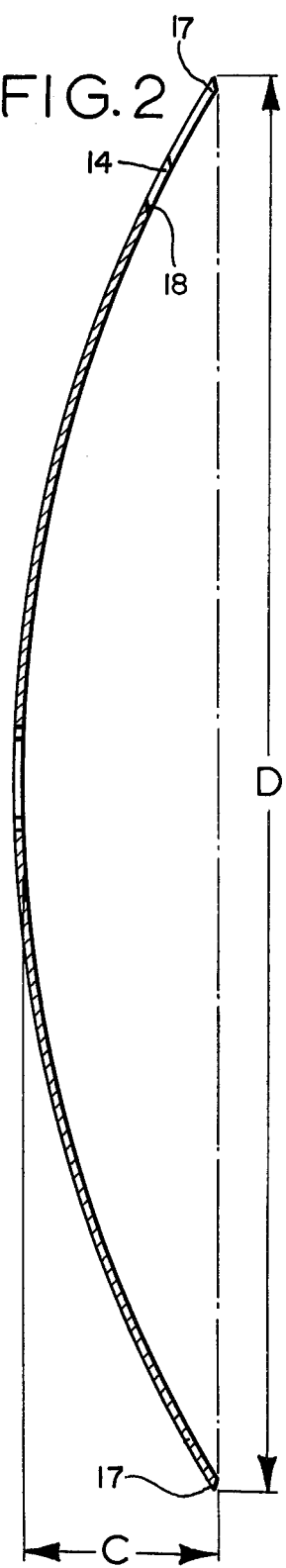

HIGH-SPEED AGRICULTURAL DISC

BACKGROUND OF THE INVENTION

This invention relates to an earth-working concave agricultural disc useful, for example, for plowing and harrowing, cutting through and mixing ground trash or crop residue, preparing seedbeds during primary and secondary tillage operations, land clearing and site preparation, and preparing road beds for highways.

A disc implement or rig usually includes at least one gang of concave or dished circular steel discs with tapered or beveled peripheral edges, all of the discs sharing a common axis. Such an implement is pulled over the earth by a tractor with the common axis of the disc gang at an angle of less than 90° from the line of forward movement of the tractor. The discs, although tending to roll or rotate as they are pulled forward, penetrate into and break up the soil, the loose soil riding up and across the concave surfaces and turning over or inverting. When tillage is performed for agricultural purposes, the objective is usually to provide a favorable soil environment for the germination and growth of a given crop. Good soil tilth is most important. Ideally, the best tilth quality is achieved when the soil is broken up or pulverized into small pieces that allow free access to air and water.

By employing cutaway notches or recesses on the periphery of each disc, the trash cutting capabilities are improved. Notched discs have better penetration because of their reduced peripheral contact area and cut heavy trash more readily since they tend to pull it under instead of pushing it ahead.

In the past, tractors pulling disc implements usually could not travel at speeds higher than about three miles per hour, and at that relatively slow discing speed the soil could be satisfactorily tilled. However, with the advancement in tractor technology, new and higher horsepower tractors are now available that can pull disc implements at much greater speeds, for example as high as ten miles per hour. Prior agricultural discs suffer from a number of disadvantages and deficiencies which render them unsatisfactory for high speed earth cutting. When conventional discs are pulled at high speeds, the concavity of the discs causes the soil to be thrown outwardly to such an extent that the ground becomes unleveled, with alternate high ridges and wide deep furrows. Of course, this tilth condition or quality is entirely unsatisfactory. Moreover, the undesired soil throwing and accumulation gives rise to soil erosion.

Another problem that occurs when prior conventional discs are pulled at high speeds is that there is a tendency to plow at a depth less than intended. As the discing speed increases over three miles per hour, disc penetration becomes quite shallow. In the past this was remedied by increasing the vertical load, usually by adding weights to the rig. With a greater vertical force, the requisite penetration could be attained, even though the degree of tilth is still entirely unsatisfactory. Moreover, the additional weight increases the draft force required to pull the discs, resulting in wasteful energy consumption.

Another disadvantage of using supplemental weight to obtain the required penetration is that undesired soil compaction occurs. Of course, the greater the soil is compacted, the more difficult it is for seeds to germinate. In addition, compacted soil is hard to work with next time the field is tilled.

The present invention provides a circular, dished earth-cutting agricultural disc which lends itself to high speed use and overcomes all of the above problems and shortcomings. At high discing speeds, the soil may be cultivated without excessive throwing thereof and the resultant formation of furrows with spaced interruptions of accumulated soil, as is common with prior discs. The disc of the present invention has improved penetration capability, requiring less vertical force to penetrate to a given desired depth, as a consequence of which less draft force must be pulled by the tractor, thus conserving energy. Furthermore, by needing less weight for penetration, there is less compaction of soil.

Moreover, and this advantage is present even at low discing speeds, the unique geometric configuration of the present disc achieves vigorous stirring and mixing of soil to an extent and at a depth not attainable with prior discs at any speed.

SUMMARY OF THE INVENTION

The circular, dished earth-cutting agricultural disc of the invention has a series of equally spaced, relatively deep W-shaped notches around its circular periphery, the center portion of each W-shaped notch constituting a tooth which extends radially outwardly to a point substantially short of the disc's circular periphery. Optimum tillage results and tilth quality are achieved when the ratio of disc diameter to concavity is in the range from nine to thirteen.

DESCRIPTION OF THE DRAWING

The features of the invention which are believed to be novel are set forth with particularity in the appended claims. The invention, together with further advantages and features thereof, may best be understood, however, by reference to the following description in conjunction with the accompanying drawing in which:

FIG. 1 is a partial plan view of a dished agricultural disc, as viewed from its concave side, constructed in accordance with one embodiment of the invention; and, FIG. 2 is a sectional view taken along the plane of section line 2—2 in FIG. 1.

DESCRIPTION OF THE ILLUSTRATED EMBODIMENT

Disc 10, preferably made of high carbon steel, has a dished configuration that is generally spherical, namely it constitutes a section of a sphere, although any appropriate concavo-convex shape may be employed. For best results, however, with the unique peripheral shape of disc 10 there is a preferred relationship between the disc diameter D and the disc's concavity, which is reflected by dimension C. Of course, dimension C is directly proportional to and represents the amount of concavity. More specifically, it has been found that optimum results are obtained when the ratio of disc diameter to concavity (or D/C) is in the range from 9 to 13. For example, the disc illustrated in the drawing may have a diameter of 28 inches, in which case the concavity dimension C should be about 2.66 inches. Such a disc would also preferably have a thickness of 0.25 inch.

Equally spaced, relatively deep W-shaped notches 12 are cutout around the circular periphery of disc 10, the center portion of each notch being shaped to form a small radially extending tooth 14 whose radial length is less than half the radial depth of the notch. The peripheral edges of the arcuate shaped unnotched portions 17 and of the teeth 14 are tapered or beveled to provide cutting edges. Preferably, the tapers are made by shearing operations. In the illustrated case, the sheared surfaces are provided on the disc's concave side, but such surfaces could be made on the convex side instead, or even on both sides. In addition, sheared surfaces 18, on the two sides of each tooth 14, meet the convex side of disc 10 at variable acute angles to form additional cutting edges within each W-shaped notch 12. Of course, sheared surfaces 18 could be formed on the disc's convex side.

It has been found that the illustrated disc achieves excellent tillage results and tilth quality at tractor speeds as high as 10 miles per hour. With the D/C ratio in the 9-13 range, the disc cuts or digs beneath the earth's surface and the loose soil moves up and across the concave surface of the disc, inverting or turning over. At the same time, the open-mouth W-shaped notches 12 accomplish vigorous cutting, stirring and mixing of the soil, as a result of which the soil is thoroughly and uniformly pulverized. Furthermore, and of great importance, the W-shaped notches allow the soil to move in the disc's axial direction, thereby preventing soil accumulation to the side of the disc and leaving the ground leveled. Until the present invention, it was not possible to obtain a satisfactory penetration while providing excellent pulverization at high discing speeds.

A feature of the invention resides in the capability of disc 10 to stir the soil by the movement of soil in transverse directions at surface and sub-surface levels. The W-shaped notches 12 partially release the back pressure on the convex side of disc 10 and increase the suction on the concave side for transverse movement of soil. Teeth 14 stir the soil as the disc rotates, producing a better microclimate for a seedbed than is possible with prior discs. To explain further, when a W-shaped notch enters the soil under pressure of vertical force, the soil breaks loose and then the center tooth 14 penetrates and further breaks the soil, thereby improving the texture of the cultivated soil. Each notch penetrates below the usual depth of cultivation, moving the soil in a transverse direction at surface and sub-surface levels and raising relatively hard, cloggy soil to the top, thereby improving the seed germination quality of the soil. In effect, each tooth 14 attacks or chops the soil for the second time for better pulverization. Since the back pressure on the convex side of disc 10 is a major component of the wear process, a reduction in such back pressure, which is accomplished by notches 12, results in a reduction of wear.

Disc 10 also has excellent capabilities for cutting heavy trash, weeds and roots since it has more peripheral edge length for cutting in the vicinity of the disc circumference.

Since the disc of the present invention has such superior penetrating capability, even at high speeds, less vertical force is needed to hold it to a given depth and this means less weight must be pulled by the tractor. Hence, less draft force and horsepower are needed to perform the same work, resulting in a conservation of energy. In addition, with less vertical force required to hold the disc to a desired depth, there is less compaction of soil.

The invention provides, therefore, a unique high-speed, earth-working agricultural disc having excellent penetration, tilling, soil inverting, stirring, mixing and pulverizing capabilities, without throwing the soil to one side and creating high ridges of soil accumulation with intervening deep furrows.

While a particular embodiment of the invention has been shown and described, modification may be made, and it is intended in the appended claims to cover all such modifications as may fall within the true spirit and scope of the invention.

I claim:

1. A circular, dished earth-cutting agricultural disc having a series of equally spaced, relatively deep W-shaped notches around its circular periphery, the center portion of each W-shaped notch constituting a tooth which extends radially outwardly to a point substantially short of the disc's circular periphery.

2. An agricultural disc according to claim 1 wherein the radial length of each tooth is less than half the radial depth of each W-shaped notch.

3. An agricultural disc according to claim 1 whose ratio of disc diameter to concavity is in the range from 9 to 13.

4. An agricultural disc according to claim 1 wherein each unnotched peripheral portion is arcuate shaped and tapered to form a cutting edge.

5. An agricultural disc according to claim 4 wherein the radially outermost portion of each tooth is tapered to provide a cutting edge.

6. An agricultural disc according to claim 5 wherein the tapers on said unnotched peripheral portions and on said teeth are formed by sheared surfaces.

7. An agricultural disc according to claim 6 and having sheared surfaces alongside each tooth which meet one side of the disc at variable acute angles to form additional cutting edges within each notch.

* * * * *